United States Patent [19]

Klim et al.

[11] Patent Number: 5,732,233

[45] Date of Patent: Mar. 24, 1998

[54] HIGH SPEED PIPELINE METHOD AND APPARATUS

[75] Inventors: Peter Juergen Klim, Austin; Nandor G. Thoma, Plano, both of Tex.

[73] Assignee: International Business Machines Corporation, Armonk, N.Y.

[21] Appl. No.: 376,706

[22] Filed: Jan. 23, 1995

[51] Int. Cl.$^6$ .................................................. G06F 9/00
[52] U.S. Cl. ........................... 395/376; 395/800; 395/377; 326/17
[58] Field of Search .................... 395/800, 375, 395/550, 376, 377; 326/17, 21

[56] References Cited

U.S. PATENT DOCUMENTS

| | | | |
|---|---|---|---|
| 4,700,187 | 10/1987 | Furtek | 340/825.83 |
| 4,837,740 | 6/1989 | Sutherland | 364/DIG. 2 |
| 4,845,633 | 7/1989 | Furtek | 364/490 |
| 4,918,440 | 4/1990 | Furtek | 340/825.83 |
| 5,105,424 | 4/1992 | Flaig et al. | 370/94.1 |
| 5,117,314 | 5/1992 | Bathaee et al. | 360/51 |
| 5,187,800 | 2/1993 | Sutherland | 395/800 |
| 5,386,585 | 1/1995 | Traylor | 395/800 |
| 5,553,276 | 9/1996 | Dean | 395/550 |
| 5,572,690 | 11/1996 | Molnar et al. | 395/376 |
| 5,592,103 | 1/1997 | Sutherland | 326/17 |

OTHER PUBLICATIONS

Franklin et al., "Clocked and Asynchronous Instruction Pipelines", *Microarchitecture, 1993 International Symposium*, IEEE, Dec. 1993, pp. 177–184.

Pagey et al., "Issues in Fault Modelling and Testing of Micropipelines", *Asian Test Symposium, 1992*, IEEE, Nov. 1992, pp. 107–111.

Karthik et al., "Interlock Schemes for Micropipelines: Application to a Self–Timed Rebound Sorter", *Computer Design –ICCD'91, 1991 International Conference*, IEEE, Oct. 1991, pp. 393–396.

I.E. Sutherland, Micropipelines, Communications of the ACM, Jun. 1989, vol. 32, No. 6.

*Primary Examiner*—Alyssa H. Bowler
*Assistant Examiner*—Walter D. Davis
*Attorney, Agent, or Firm*—Anthony V.S. England

[57] ABSTRACT

A data processing apparatus has a number of data processors connected in a series by data lines so that data signals are processed in a preceding processor and communicated to a succeeding processor in the series. The apparatus has a number of control elements, where a control element has first and second inputs receiving processor status signals and an output sending a signal to enable processing. The control element output assumes a certain output state only if both inputs assume the state. The output, having assumed the state, holds the state, despite one of the inputs not holding the state, only if a certain one of the inputs does hold the state.

15 Claims, 10 Drawing Sheets

FIG. 1

PRIOR ART

FIG. 2A

PRIOR ART

HIGH SPEED PIPELINE METHOD AND APPARATUS

FIELD OF THE INVENTION

A pipeline processor system is disclosed. More particularly an asynchronous pipeline incorporating very high speed, event-driven control elements is disclosed.

RELATED ART

In digital signal processing, arithmetic computation, and instruction interpretation applications it is common to process data in stages where the processing result of one stage is passed to a subsequent stage for further processing by connecting a number of processors together as a series of stages with the stages operating on data as the data passes along from one stage to the next. A pipeline processor (also referred to simply as a pipeline) is one of these devices having a series of interconnected processing stages, where the stages may operate concurrently. For purposes of this discussion it will be assumed that a pipeline has a beginning and ending stage with at least one intermediate stage therebetween.

There are a variety of distinctions among pipeline processors. One distinction concerns whether the processor stages act in unison based on an external clock (a "synchronous" pipeline) or whether they may act independently based on local events (an "asynchronous" or "event-driven" pipeline).

In an event-driven pipeline an intermediate stage takes in new data whenever the stage has processed its data, the stage which follows it has taken the processed data, and the stage which precedes it has new data ready. Thus, in this type of pipeline, once the pipeline has been initialized an intermediate stage may be controlled solely with information from adjacent stages.

EVENT-DRIVEN CONTROL ELEMENTS

Figure 1:
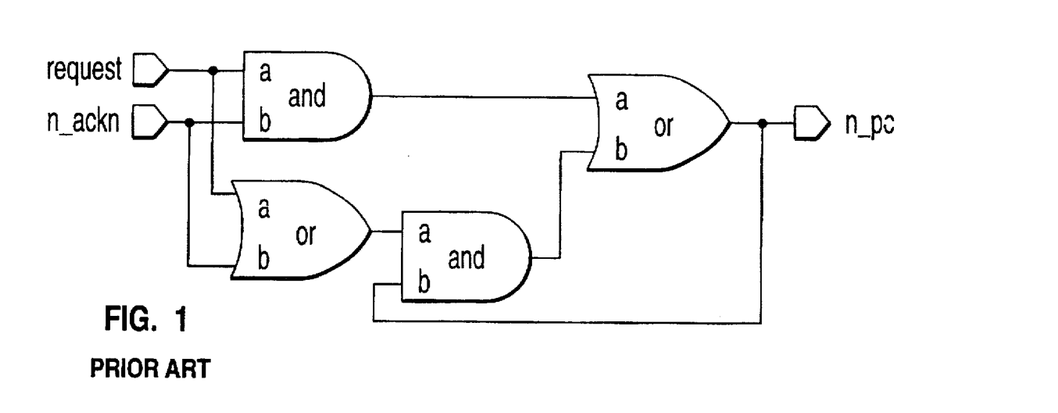
FIG. 1 is a two input Muller C-element logic representation (prior art).

It is well known to use control elements known as Muller C-elements for pipeline control. See, e.g., Sutherland, *Micropipelines*, 32 Communications of the ACM 720 (1989). The operation of a Muller C-element is relatively simple. It is commonly understood by the person of ordinary skill in the art that more complicated control elements may be designed. See, e.g. Sutherland, *Asynchronous Pipelined Data Processing System*, U.S. Pat. No. 5,187,800 (1993). The output of a two input Muller C-element changes state, regardless of its previous state, only after both inputs have changed state. Otherwise, the Muller C-element retains its previous state. A configuration of Boolean logic gates which provides a two-input Muller C-element is shown in the FIG. 1 and is stated in the following Boolean algebra terms:

$$Q_n = (A*B) + (A+B)*(Q_{n-1}),$$

where $Q_n$ refers to the output state at a time $t_n$, and $Q_{n-1}$ refers to the output state immediately preceding the state at time $t_n$.

It can be seen by inspection that the configuration of FIG. 1 provides an output which changes state only after both inputs have changed. That is, if both A and B are high then the output is high, and if both A and B are low then the output is low. Thereafter, if either A or B changes state, so that one, but not both, are high, the output remains unchanged at $Q_{n-1}$. when both A and B have changed from high to low, or from low to high, the output also changes from high to low, or from low to high, as the case may be.

Figure 2A:
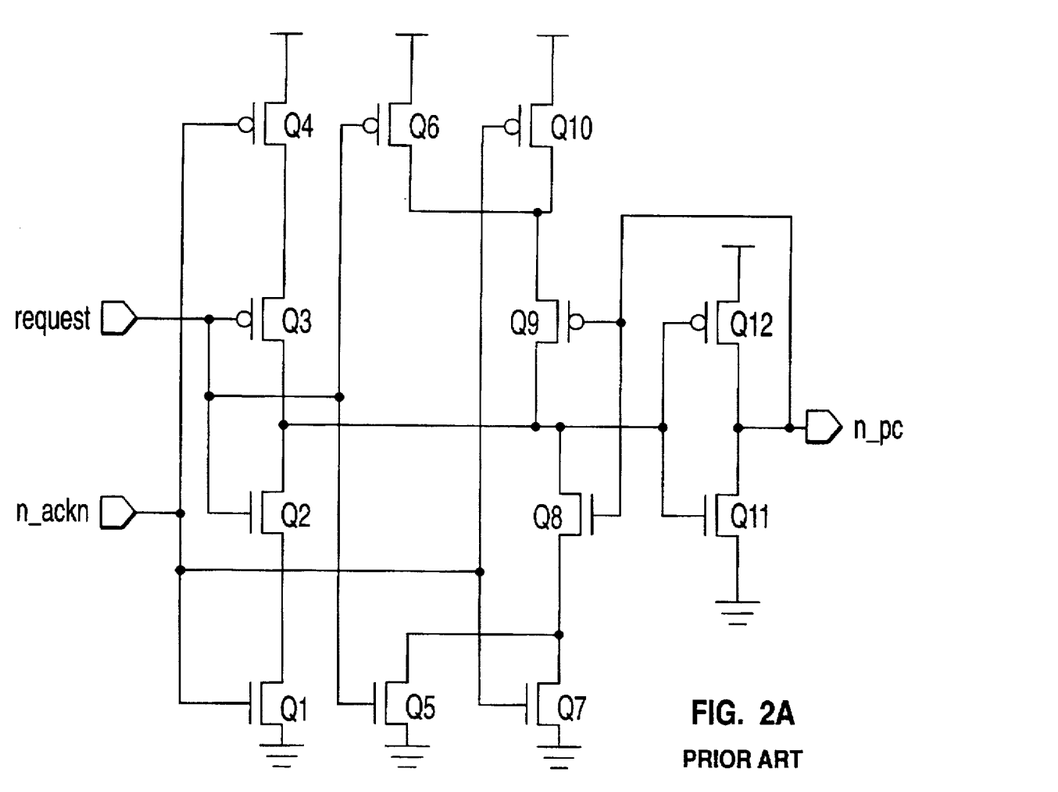
FIG. 2A is a circuit diagram for the Muller C-element of FIG. 1 (prior art).
Figure 2B:
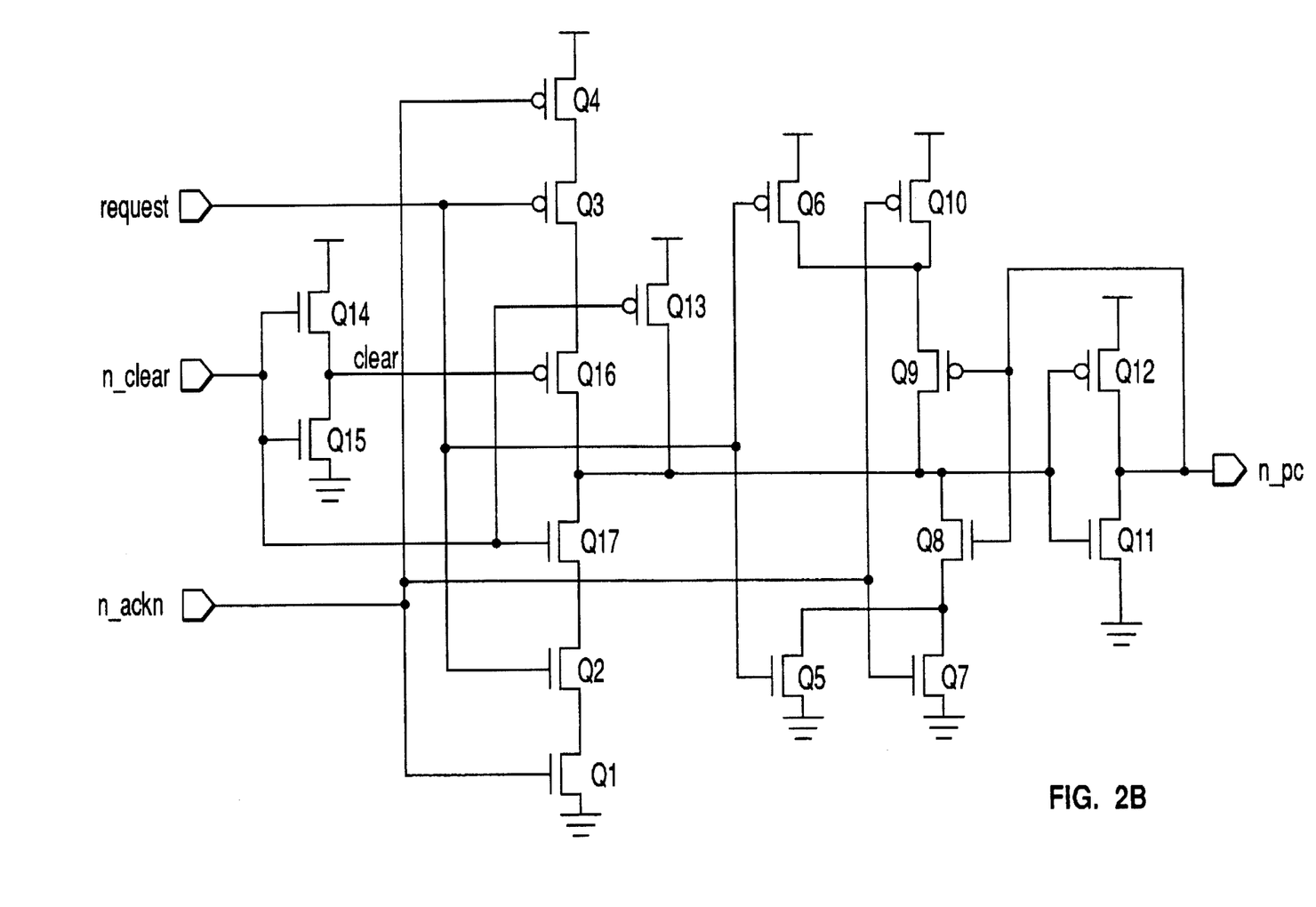
FIG. 2B is a circuit diagram for the Muller C-element with a "clear" input.

A typical circuit diagram for the Muller C-element of FIG. 1 is shown in FIG. 2A.

The Muller C-element has quite a number of components. This tends to slow down operation of the device. In the circuit of FIG. 2 the "acknowledge" input switches four field effect transistors, Q1, Q4, Q7 and Q10, the "request" input switches four other FET's, Q2, Q3, Q5 and Q6. These input FET's switch two output FET's, Q11 and Q12, which in turn switch two holding FET's, Q8 and Q9.

Also, the particular type of transistor tends to slow down operation of the Muller C-element. In order to cause the output FET's to switch, each input signal must switch four FET's consisting of two complementary pairs of FET's, an n-type and a p-type FET in each pair. P-type FET's generally switch much slower than the n-type due to the requirement that for a given conductance a p-type FET must be approximately twice as large as an n-type FET.

Finally the configuration of the components tends to slow down operation of the Muller C-element. That is, in order to switch the output FET's, the particular input FET's that must switch include a FET that is in series with other FET's. For example, with the output low in the control element in FIG. 2A, and with the acknowledge signal high and request signal low, in order to switch the output FET's, Q11 and Q12, the acknowledge signal must switch Q1 on and Q10 off. The switching of Q10 is especially slow not only because it is a p-type FET, but also because it is stacked in series with a number of other FET's.

Thus, although a Muller C-element is relatively simple, the speed of a pipeline controlled by a Muller C-element may be somewhat impaired by the relatively slow operation of the control element.

SUMMARY OF THE INVENTION

A data processing apparatus has a number of data processors connected by data lines in a series so that data signals are processed in a preceding processor and communicated to a succeeding processor in the series. The term "processor" and the term "stage" may be used interchangeably herein, so that a processor having a series of stages may also be referred to as a series of processors. Furthermore the term "processor" as used herein should be understood to include buffers which merely perform a storage function, so that reference to a series of processors may include a shift register or series of shift registers. The apparatus has a number of reduced-state control elements, where a control element has first and second inputs receiving processor status signals and an output sending a signal to enable processing. The output assumes a certain output state only if both inputs assume that same state. The output, having assumed the state, remains in that state, despite a specified one of the inputs switching states, only if the other one of the inputs remains in the state.

In accordance with another aspect of the invention, the control element has a number of input FET's switched by the input signals, including a single FET providing the first input, and has a pair of output FET's connected to, and switched by, the input FET's providing the control element output. The output state of the control element may be changed by an input signal switching just the first input FET, and the first input FET switching just the output FET pair.

In a further aspect of the invention, the data lines include data input lines and data output lines for communicating input data signals and output data signals. A processor has an active interval. During the active interval the data signals are processed in a preceding processor and communicated to a succeeding processor. Only signals on the processor data output lines during the processor active interval and after completion of processing represent active output data. The control element first input indicates whether the data output lines of one processor have active data. The control element second input indicates whether the data output lines of another processor have active data. The control element enables processing in still another processor when the control element first input indicates active data, and the control element second input indicates no active data. Once the control element has enabled the processing, the control element continues to enable the processing until the control element second input indicates active data.

A further aspect of the invention, is repeatedly processing data during a number of processor active intervals, where the active interval of one processor is asynchronous with the active interval of another processor.

An object of the invention is to process data at a very high speed in a series of processors under control of a reduced state, event-driven control element.

Still other objects and advantages of the present invention will become readily apparent to those skilled in this art from the following detailed description. The preferred embodiment of the invention is shown simply by way of illustration of the best mode contemplated of carrying out the invention. Other embodiments are possible and the details may be modified in various respects without departing from the invention. Accordingly the drawing and description are to be regarded as illustrative in nature, and not restrictive.

DETAILED DESCRIPTION OF THE PREFERRED EMBODIMENT

OVERVIEW OF OPERATION

Figure 3:
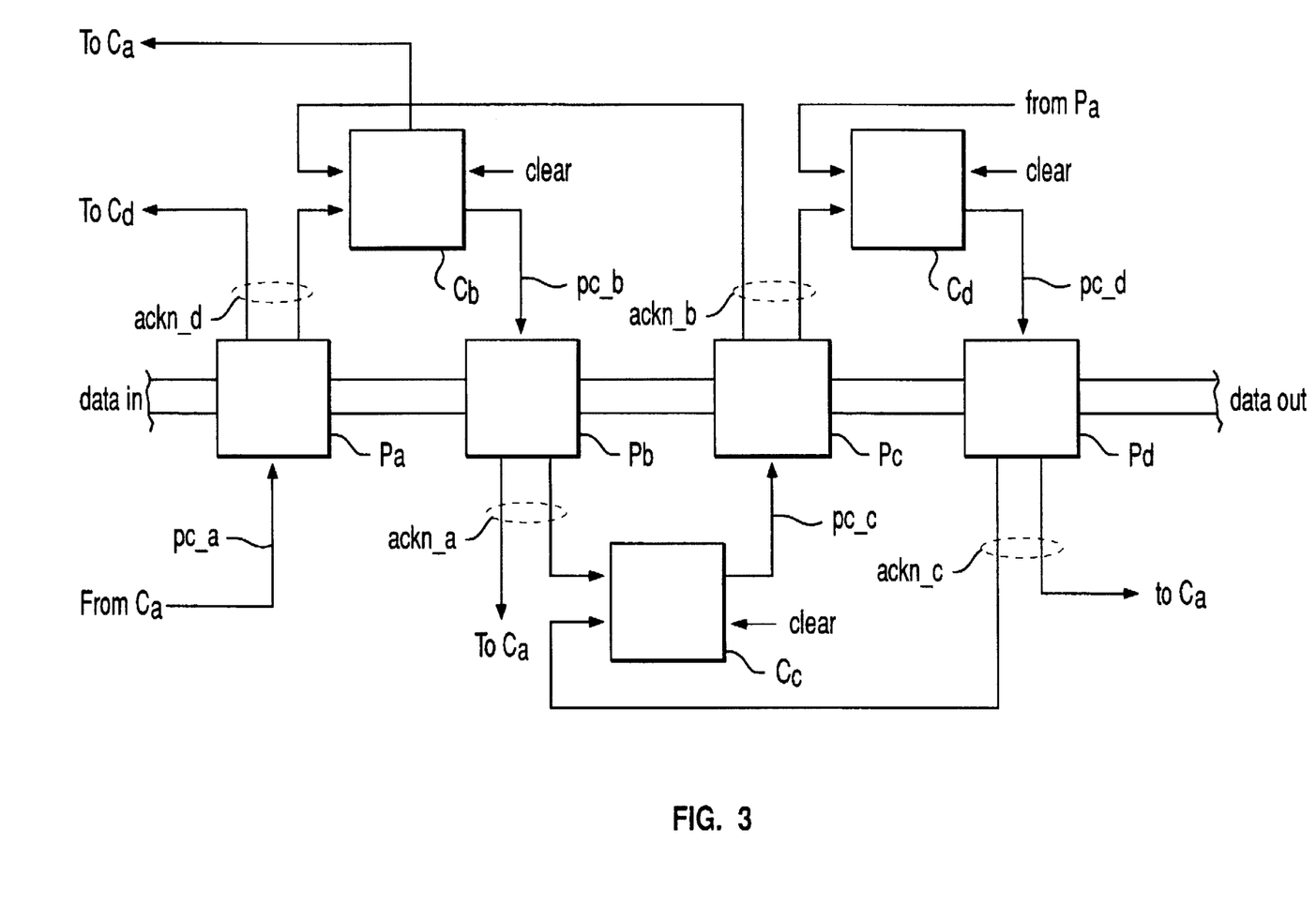
FIG. 3 is a block diagram of the pipeline of the present invention.

In FIG. 3 the pipeline of the preferred embodiment of the present invention is shown with a first, second, third and fourth processor, $P_a$, $P_b$, $P_c$ and $P_d$, each with one or more data input and data output lines. $P_a$ is typical of the processors and is shown in detail in FIG. 4. The processor $P_a$ has a subprocessor eval_tree$_a$, with a data input S1, a data input S1n (the logical complement of the input S1), and a control input pc_a. The subprocessor has an output S and a complementary output Sn. When the subprocessor control input pc_a is low, the subprocessor eval_tree$_a$ is forced into a precharge'state wherein the subprocessor does not evaluate data and the outputs S and Sn are both low. If the outputs S and Sn are both high this indicates a fault condition. When the control input pc_a goes high, the processor becomes active and processes the data at its inputs and then puts the result on its output S and puts the complement on its output Sn provided that the inputs S1 and S1n must be complements. It is well known by those skilled in the art to design processors which will provide a complemented output so that it is not necessary to impose the condition that a signal and its complement must both be supplied as inputs to the processor; however, the processor shown in the preferred embodiment does require that a signal and its complement are both provided. Also included in the processor $P_a$ is a NOR gate having two inputs and an output. One of the NOR gate inputs is connected to output S of eval_tree$_a$, and the other input of the NOR gate is connected to output Sn, so that when eval_tree$_a$ is in a precharge state with both outputs S and Sn low, the NOR output is high, and otherwise the NOR output is low. The NOR output is labeled "ackn_a".

$P_a$, $P_b$, etc. receive and process data, hold the processed data, and then send the data to the next processor in the pipeline or to a receiving device (not shown) at the end of the pipeline. Controllers $C_b$, $C_c$ and $C_d$ receive timing signals for controlling the processors. Controller $C_b$ forces processor $P_b$ into its active interval, controller $C_c$ forces $P_c$ into its active interval, and so on. In the control scheme of the preferred embodiment of the present invention, since control of a processor active interval generally depends on the status of a preceding and a succeeding processor, the processors $P_a$, $P_b$, etc. may be considered as belonging to functional groups, with three processors in a group. The controllers associated with a group of processors likewise may be considered as a functional group. For example, in FIG. 3 a first group of processors would be processors $P_a$, $P_b$ and $P_c$, and a second group would be processors $P_b$, $P_c$ and $P_d$. The first group intermediate controller would be controller $C_b$, since controller $C_b$ is in communication with the processors in the first processor group, and since it controls the active interval of the intermediate processor of the group, processor $P_b$. Likewise, the second group intermediate controller would be $C_c$, since controller $C_c$ is in communication with the processors in the second processor group, and controls the active interval of the intermediate processor $P_c$ of the group. Controller $C_d$ may be considered an end controller, since it controls the last processor in the pipeline, processor $P_d$. In the embodiment presented here, the first processor in the pipeline is controlled by signals provided external to the pipeline, such as from a controller (not shown), which may be considered on initial controller, receiving signals from a device feeding the pipeline and from some of the pipeline processors.

Figure 5:
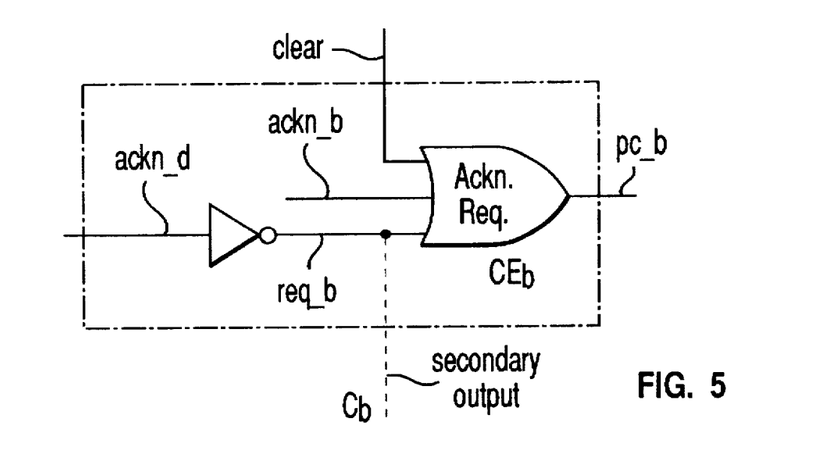
FIG. 5 is a typical controller of FIG. 3, which includes the control element of the present invention.

Controller $C_b$ is generally typical of the controllers and is shown in detail in FIG. 5. The controller $C_b$ has three inputs.

One input goes directly to an "acknowledge" input of a control element $CE_b$. A second input goes to an inverter. The output of the inverter goes to a "request" input of the control element $CE_b$. A third input provides a clear signal to the control element $CE_b$. Controller $C_b$ has a primary output labelled "pc_b". Controllers $C_c$ and $C_d$ also have primary outputs, but unlike controller $C_c$ and $C_d$, controller $C_b$ has a secondary output from the output "req_b" of the second input inverter. Also, in another embodiment of the present invention the controllers such as $C_b$, $C_c$ and $C_d$ do not have a clear input. When the present invention is practiced using controllers without a clear input, initialization may require that some predetermined sequence of data be presented to the processors.

The control element of the present invention provides a logic function as shown in the following table, which indicates the binary logical states of the inputs and the primary output of the control element. The logic states of the Muller C-element of FIG. 1 are also shown for comparison purposes.

|  | Muller C-element | | | | Present Control Element | | | |
| --- | --- | --- | --- | --- | --- | --- | --- | --- |
| Input 1 ("A" or "req") | 1 | 0 | 1 | 0 | 1 | 0 | 1 | 0 |
| Input 2 ("B" or "ackn") | 1 | 1 | 0 | 0 | 1 | 1 | 0 | 0 |
| Output $Q_{n-1}$ ("pc") | 1 | $Q_{n-1}$ | $Q_{n-1}$ | 0 | 1 | $Q_{n-1}$ | 0 | 0 |

A configuration of Boolean logic gates which provide the two input, one output control element of the present invention is shown as FIG. 6 and is stated in the following Boolean algebra terms:

$$Q_n = AB + \bar{A}B \, Q_{n-1}$$

Figure 6:
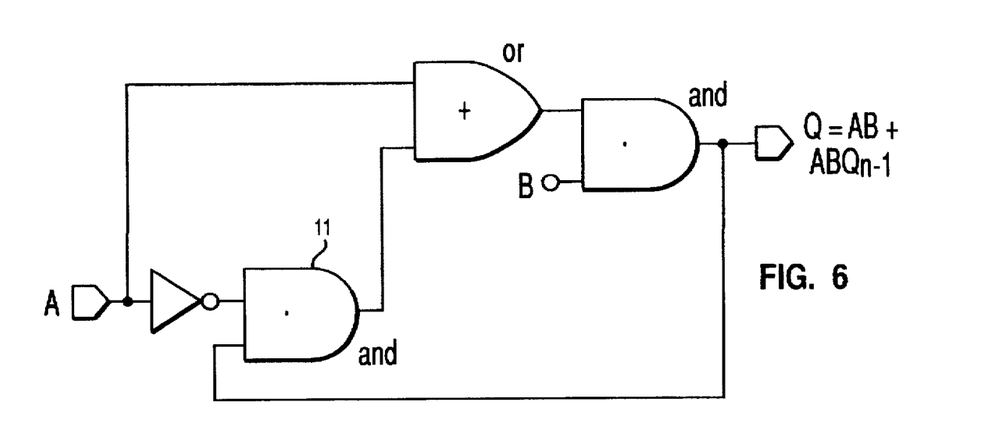
FIG. 6 is a logic representation of the control element.

It can be seen by inspection that the configuration of FIG. 6 provides an output which assumes a logical "1" state when both inputs are a logical "1" state; and a logical "0" state when the inputs are a logical "0" state. Also, once the output has assumed a logical "1" state it will maintain that state as long as input B maintains the logical "1" state regardless of whether input A changes to logical state "0"; or, stated more generally, the output will maintain its previous state as long as the input A has a logical "0" state and the input B has a logical "1" state.

The control element of the present invention has a reduced set of logical states in comparison with the states of the Muller C-element. Expressing the state of a control element as a three digit binary number where the first digit indicates the A input, the second digit indicates the B input and the third digit indicates the output state, the Muller C-element may assume the six states 000, 010, 011, 100, 101 and 111, whereas the present control element may assume only the five states 000, 010, 011, 100, and 111.

The general operation of the pipeline of the present invention is as follows. Referring again to FIG. 3, and ignoring, for now, the initialization steps, once the first processor $P_a$ has received and processed data, the processor puts the data on its output data lines, which are the data input lines for the second processor $P_b$. Then the first processor $P_a$ changes the state of the signal on control line ackn_d between it and control element $C_b$ to indicate that the first processor $P_a$ is ready to pass data to the second processor $P_b$.

The terminology used herein for labelling of the signal lines, functional blocks, and device inputs and outputs is as follows. A typical signal line in FIG. 3 is interchangeably referred to, for example, as "n_pc_a", "pc_a" or simply "pc". The "n" indicates that the signal "pc" is active low. The "a" indicates that the signal is associated with a device labeled "a". The lines carrying the status signal from processor $P_a$ to controller $C_b$ and $C_d$ in FIG. 3 are labelled "ackn_d" because one of the lines carries the status signal directly to the acknowledge input on control element $CE_d$ on controller $C_d$ (see FIG. 4). The other line labeled "ackn_d" carries the status signal from processor $P_a$ to the input of the inverter in the control element, $C_b$, which controls the second stage processor, $P_b$. The $C_b$ inverter output is the req_b signal to the $C_b$ control element (see FIG. 4).

If the third stage processor $P_c$ is ready to accept data from processor $P_b$, so that processor $P_b$ can send any data which it already has to the third stage processor $P_c$, the ackn_b signal from $P_c$ will indicate such. The req_b signal, derived from the ackn_d signal from processor $P_a$, and the ackn_b signal from processor $P_c$ trigger control element $CE_b$ to provide a signal pc_b, to processor $P_b$, causing processor $P_b$ to begin processing the data on its data input lines.

INITIALIZATION AND DETAILED SEQUENCE OF CONTROL

The initialization and detailed sequence of the control signals in the pipeline of the preferred embodiment of the present invention is as follows. To initialize the pipeline, the clear signal and the pc_a signal from a controller (not shown) preceding the pipeline both are set low and the control element $CE_b$, $CE_c$ and $CE_d$ outputs go to a low state. These outputs being low set the eval_tree circuits to their precharge state so that the eval_tree outputs are both low and the NOR gate outputs in the processors $P_a$, $P_b$, $P_c$ and $P_d$ are all high. With all the processor NOR gate outputs high the acknowledge inputs to the control elements are high, while the request inputs are low.

To begin operation of the pipeline the clear signal is set high and remains high during normal operation. Signal pc_a is set high, causing the eval_tree$_a$ circuit to begin evaluating the complemented data pair on its input lines S1 and S1n.

Once the data into eval_tree$_a$ has been evaluated, one of the complementary outputs S and Sn goes high, and the other goes low, depending on the data. The change in state in S or Sn of eval_tree$_a$ causes the $P_a$ NOR gate output ackn_d to go low, causing the req_b input to control element $CE_b$ to go high. At this point the state of eval_tree$_c$ remains unchanged from its precharge state so that ackn_b remains high.

Thus, with both ackn_b and req_b now high, the output pc_b of control element $CE_b$ changes to a high state. This causes eval_tree$_b$ to begin evaluating the data which eval_tree$_a$ has now placed on the eval_tree$_a$ output lines and eval_tree$_b$ input lines. Meanwhile, the output req_b of the $P_a$ NOR gate going low has provided a clear signal to a controller (not shown) preceding the pipeline. This controller sets pc_a low again.

Once eval_tree$_b$ finishes processing it puts a complemented data pair on its outputs S and Sn, causing the NOR gate output ackn_a to go low and the $C_c$ inverter output req_c to go high. At this point the state of eval_tree$_d$ remains unchanged from its precharge state so that ackn_c remains high.

Thus, with both ackn_c and req_c now high, the output pc_c of control element $CE_c$ changes to a high state. This causes eval_tree$_c$ to begin evaluating the data which eval_tree$_b$ has now placed on the eval_tree$_b$ output lines and eval_tree$_c$ input lines. Meanwhile, eval_tree$_a$ has been put into the precharge state again by pc_a going low, so that the ackn_d input to $CE_d$ is now high and the req_b input to $CE_b$ is now low.

Once eval_tree_c finishes processing, it puts a complemented data pair on its outputs S and Sn, causing the NOR gate output ackn_b to go low and the C_d inverter output req_d to go high. As just described, eval_tree_a is now in its precharge state, so that ackn_d is high.

Thus, with both ackn_d and req_d now high, the output pc_d of control element CE_d changes to a high state. This causes eval_tree_d to begin evaluating the data which eval_tree_c has now placed on the eval_tree_c output lines and eval_tree_d input lines. Meanwhile, with ackn_b going low due to completion of eval_tree_c processing, and with req_b already low due to eval_tree_a having been put into precharge, the output of control element CE_b goes low, which puts eval_tree_b into precharge and causes ackn_a to go high and req_c to go low.

Once eval_tree_d finishes processing, it puts a complemented data pair on its outputs S and Sn, causing the NOR gate output ackn_c to control element C_c. With signal ackn_c going low due to completion of eval_tree_a processing, and with signal req_c already low due to eval_tree_a having been put into precharge, the output of control element CE_c goes low, which puts eval_tree_c into precharge and causes ackn_b to go high and req_d to go low. Meanwhile, the req_a low signal has gone to the controller (not shown) which precedes, the pipeline. This controller causes pc_a to go high, which launches eval_tree_a to begin a new processing cycle. When eval_tree_a completes processing its data, ackn_d goes low, which, together with req_d low, puts eval_tree_d into precharge so that eval_tree_d is set for a new cycle.

As described above, in the initial cycle the acknowledge signals to the control elements CE_b, CE_c and CE_d are initially high, the request signals are initially low and the control elements outputs are initially low, so that the control element outputs are forced high by the request signals going high, where the acknowledge signals are already high due to initialization. In later cycles, since propagation of the acknowledge signals is slower than that of the request signals, a control element's output is forced high by the acknowledge signal going high, where the request signal is already high. Therefore, the timing diagrams of FIG's 10 through 13 indicate that the request signals go high before the acknowledge signals during a timing cycle. It is also possible to arrange the control signals so that in cycles after the initial cycle the acknowledge signals go high before the request signals.

OPERATION OF THE EVAL_TREE CIRCUIT

Figure 4:
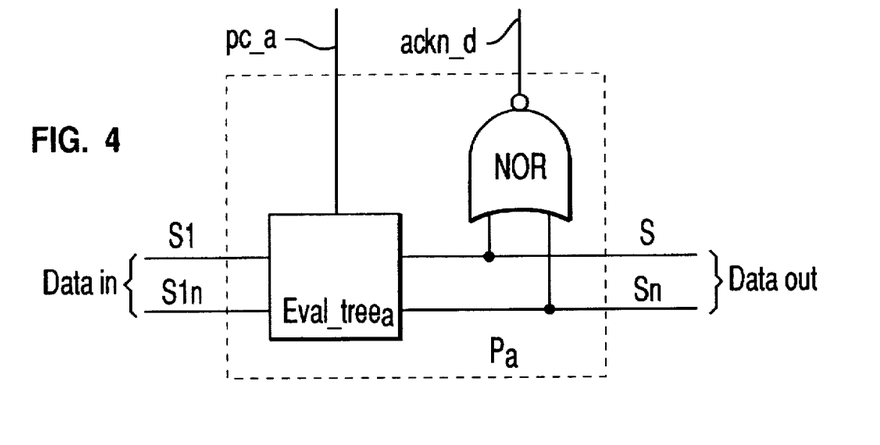
FIG. 4 is a typical processor block of FIG. 3.

For the purpose of illustrating the performance of the control element of the present invention, an "eval_tree" circuit was used for the typical eval_tree_a subprocessor of FIG. 4. This circuit provides a buffer, so that the pipeline of the embodiment of the present invention illustrated herein functions as a first-in-first-out shift register. Other subprocessors could be substituted in order to provide a variety of functions such as computation or instruction interpretation.

Figure 7:
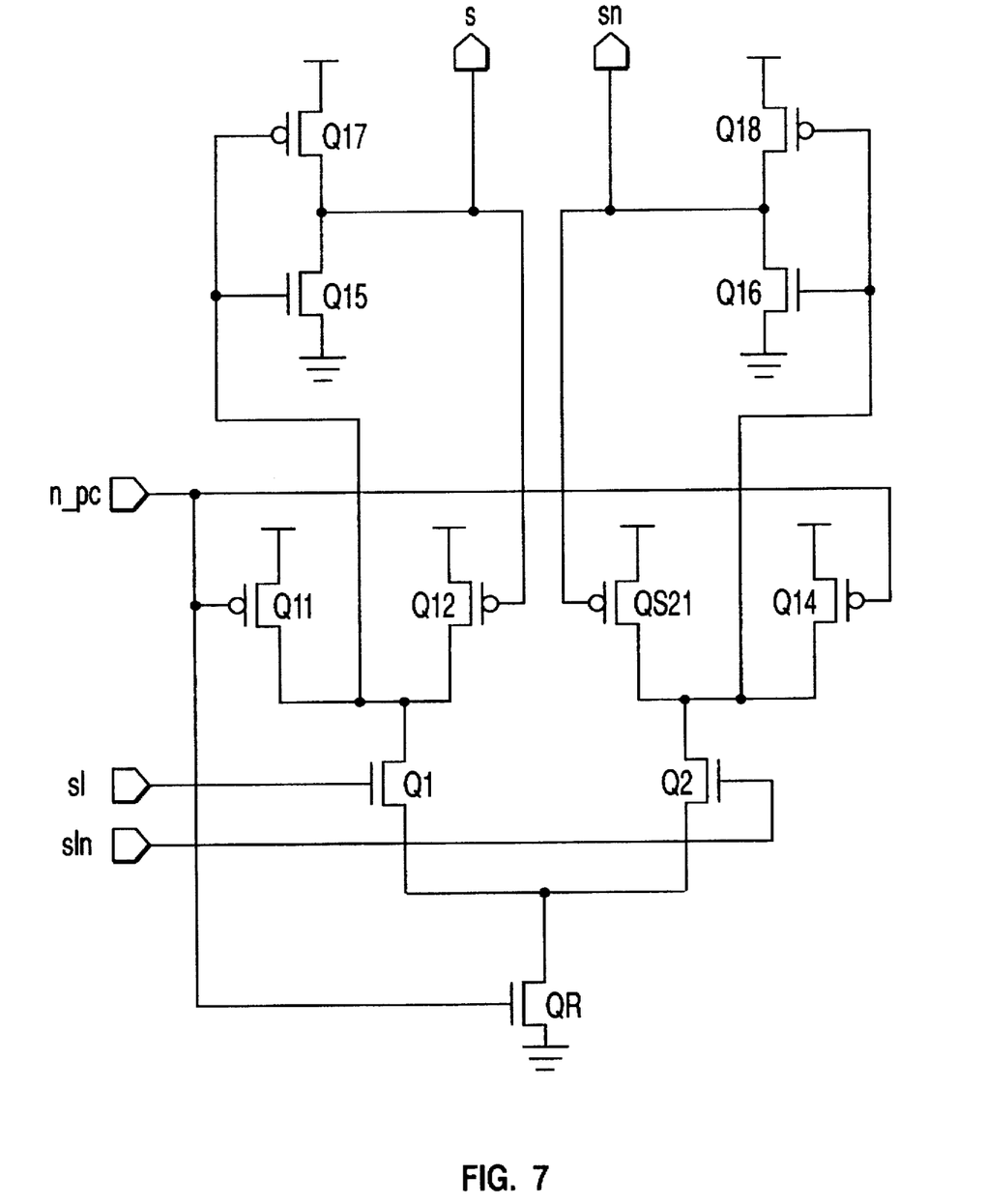
FIG. 7 is a circuit diagram for the eval_tree circuit of the processor block of FIG. 4.

The eval_tree circuit is shown in FIG. 7. In this circuit a control input pc is connected to the gates of two p-type field effect transistors ("FET"s), Q11 and Q14. The sources of Q11 and Q14 are connected to a power supply. Data inputs S1 and S1n are connected to the gates of n-type FET's Q1 and Q2 respectively. The sources of Q1 and Q2 are connected to the drain of QR. The source of QR is connected to ground. The drains of Q1 and Q2 are connected to the drains of Q11 and Q14 respectively. The drain of Q1 is also connected to the gates of a p-type FET Q17 and an n-type FET Q15 as well as the drain of a p-type FET Q12. Likewise the source of Q2 is connected to the gate of a p-type FET Q18 and the gate of an n-type FET Q16, as well as the drain of a p-type FET QS21. The sources of Q12, Q17, QS21 and Q18 are connected to the power supply. The drain of Q17 is connected to the source of Q15 and the gate of Q12. The source of Q15 is connected to ground. Likewise the drain of Q18 is connected to the drain of Q16 and the gate of QS21. The source of Q16 is connected to ground. Output S is provided by a connection to the drain of Q17. Likewise output S_n is provided by a connection to the drain of Q18.

The eval_tree circuit operates as follows. With pc in a low state Q11 and Q14 are turned on and QR is turned off. With QR off, inputs S1 and S1n do not affect operation of the eval_tree outputs. Q11 on turns off Q17 and turns on Q15. Likewise, Q14 on turns off Q18 and turns on Q16. Q15 on brings S low and turns on Q12. Likewise, Q14 on brings Sn low and turns on QS21. With both S and Sn low the NOR output (see FIG. 4) is high.

When pc_a goes high the eval_tree begins processing data at its inputs S1 and S1n. The inputs S1 and S1n are provided by an external circuit as complements to the eval_tree circuit. When pc_a goes high, this turns off Q11 and Q14, and turns on QR, so that S1 and S1n can affect the eval_tree outputs.

If S1 is high, S1n will be low. When processing begins with these inputs, Q1 is turned on and Q2 is turned off. Q1 and QR on turns on Q17 and turns off Q15. Q17 on turns off Q12 and brings S high. Since Q2 is off, QR does not affect Q16 or Q18, so that the feedback loop through QS21 continues to hold Q16 and Q18 in their previous state, and thereby holds Sn in its previous low state. With S high and Sn low, the NOR output (see FIG. 4) is low.

Alternatively, if S1 is low, S1n will be high. When processing begins with these inputs, Q1 is turned off and Q2 is turned on. Q2 and QR on turns on Q18 and turns off Q16. Q18 on turns off QS21 and brings Sn high. Since Q1 is off, QR does not affect Q15 or Q17, so that the feedback loop through Q12 continues to hold Q15 and Q17 in their previous state, and thereby holds S in its previous low state. With S low and Sn high, the NOR output (see FIG. 4) is low.

OPERATION OF THE CONTROL ELEMENT

Figure 8:
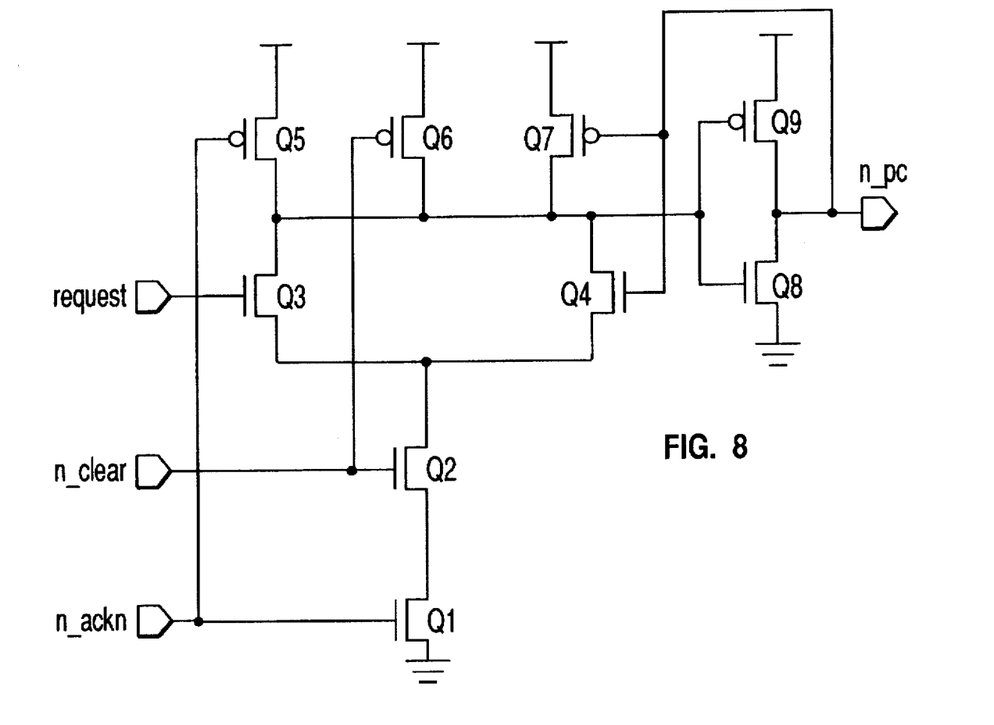
FIG. 8 is a circuit diagram for the preferred embodiment of control element of the controller of FIG. 5, wherein the control element has a "clear" input.
Figure 9:
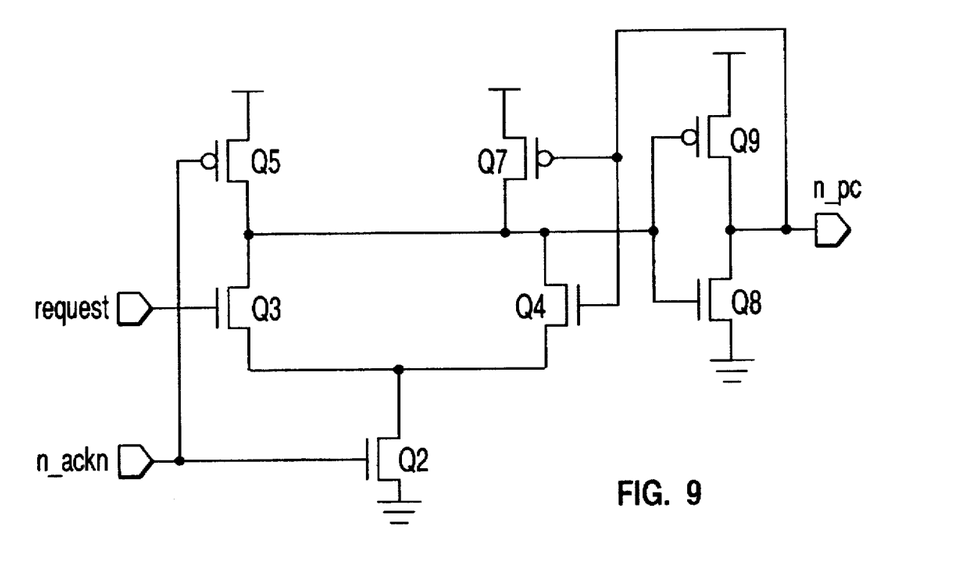
FIG. 9 is a current diagram for an alternative embodiment of the control element, wherein the control element does not have a "clear" input.

For the preferred embodiment of the present invention, FIG. 8 shows the circuit of the control element used as the typical CE (shown as CE_b in FIG. 5). The acknowledge input is connected to the gates of a p-type FET, Q5, and an n-type FET, Q1. The source of the FET Q5 is connected to a power supply. The drain of Q5 is connected to the drain of an n-type FET, Q3, which has a gate that serves as the request input. The source Q3 is connected to the drain of an n-type FET, Q2, which has a gate that serves as a clear input. The source of Q2 is connected to the drain of Q1. The source of Q1 is connected to ground.

Also connected to the drains of Q3 and Q5 is the drain of a p-type FET, Q6, having a gate that is connected to the same clear signal connected to the gate of Q2. The source of Q6 is connected to the power supply.

Also connected to the drains of Q3 and Q5 are the gates of a p-type FET, Q9, and an n-type FET, Q8. The source of Q9 is connected to the power supply. The source of Q8 is grounded. The drains of Q9 and Q8 are connected together and provide the output, pc_b.

Also connected to the drains of Q3 and Q5 are the drains of a p-type FET, Q7, and an n-type FET, Q4. Both Q4 and Q7 have gates connected to the pc output line. The source of Q7 is connected to the power supply. The source of Q4 is connected to the drain of Q2 and the source of Q3.

The control element of FIG. 8 operates as follows. Initially clear is asserted low to force pc__b low by turning on Q6, which turns off Q9 and turns on Q8. By turning on Q8, pc is forced low. Once pc is low, Q7 is turned on and Q4 is turned off.

Referring now to FIG. 5, as described above in the overview of operation, input ackn__b is initially high and input req__b is initially low, as set during the precharge state of the processor $P_a$. After initialization, the clear signal is returned to its normal, high state. Referring again to FIG. 8, with clear high, Q6 turns off and Q2 turns on. The pc__b signal is held high by Q7. Ackn__b high turns on Q1 and turns off Q5.

Then, when req__b goes high, Q3 is turned on, which turns on Q9 and turns off Q8. Turning on Q9 forces pc___b high, which turns off Q7 and turns on Q4. Thus, by req__b going high after ackn__b, output pc is forced high by the req__b input switching solely Q3, and by Q3 switching solely Q9 and Q8.

Now pc__b will be held high if req__b goes low and ackn__b remains high. That is, if only req__b goes low, Q3 will turn off, but pc__b will still be held high through Q4, Q2 and Q1 holding Q9 on.

When ackn__b goes low, and with req__b low, pc__b will be forced low again through Q5 turning on, which will turn on Q8 and turn off Q9. In the pipeline configuration of FIG. 3, during later cycles req__b will go high before ackn__b. With ackn__b low, when req__b goes high Q3 is turned on, but does not cause any other FET's to switch due to Q1 begin off. Then, when ackn__b goes high this switches Q1 on and Q5 off so that Q9 is switched on and Q8 is switched off through Q1, Q2 and Q3. Q9 switching on forces output pc high. Thus, by ackn__b going high after req__b, output pc is forced high by the ackn__b input switching solely Q1 and Q5, and by Q1 and switching solely Q8 and Q9.

Figure 10:
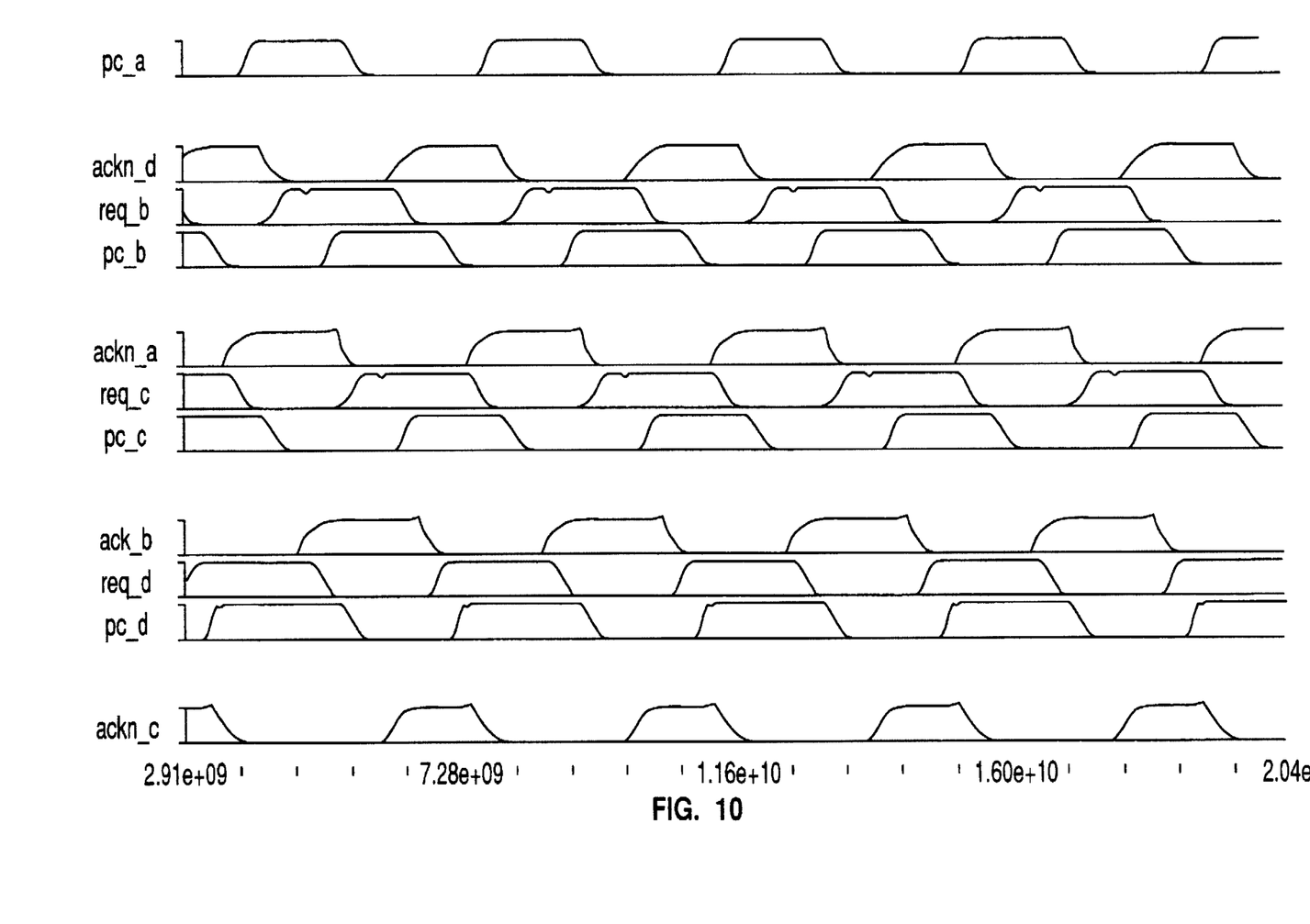
FIG. 10 is a timing diagram for the pipeline of the present invention (FIG. 3) where the Muller C-element is used instead of the control element of (FIG. 8) the present invention in controllers $C_b$, $C_c$ and $C_d$ of FIG. 5.
Figure 11:
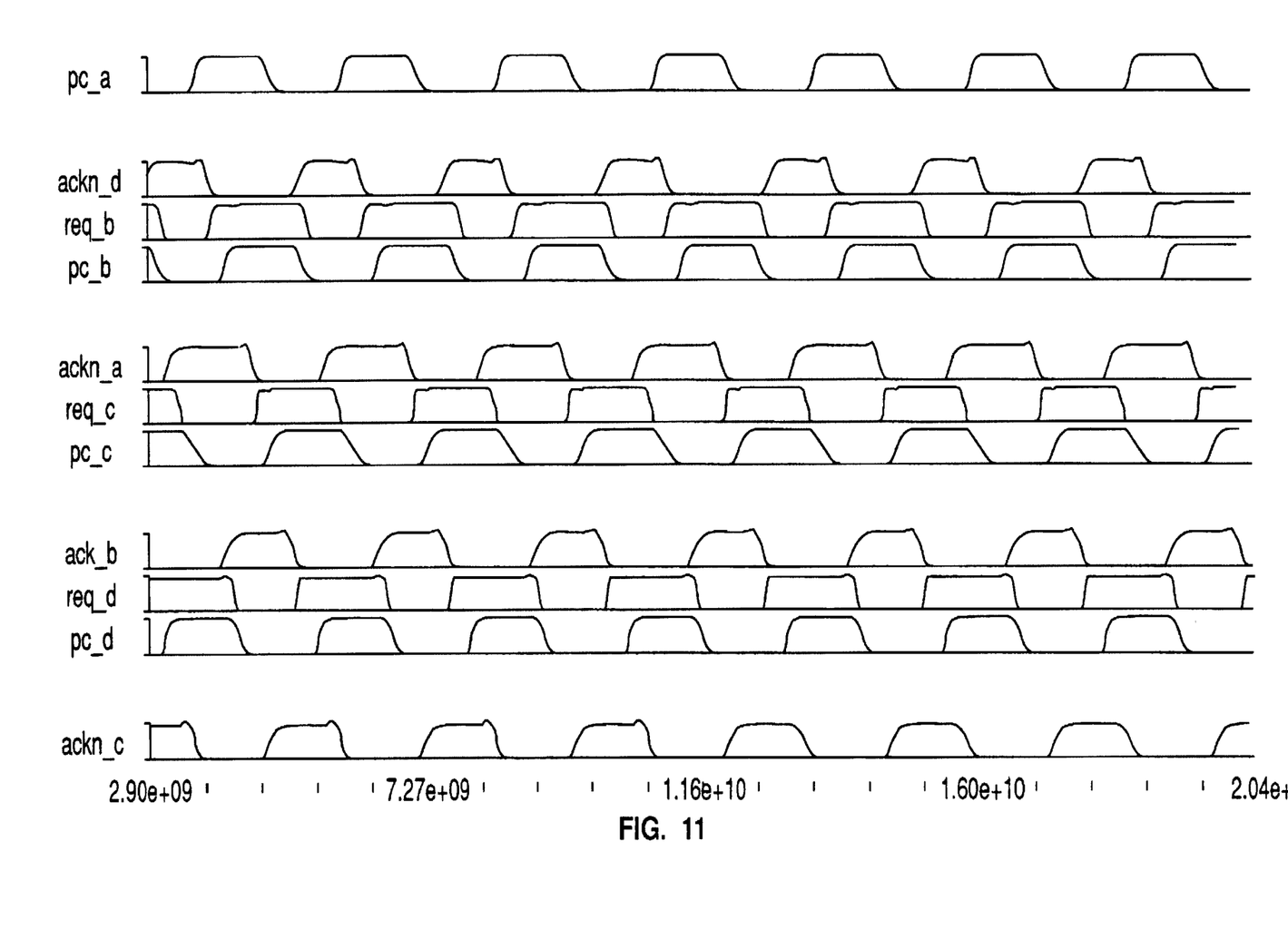
FIG. 11 is a timing diagram for the present pipeline (FIG. 3) where the control element of the present invention is used in the controllers $C_b$, $C_c$ and $C_d$ of FIG. 5.

In the embodiment of the invention presented here a Muller C-element may be substituted for the control element in controllers $C_b$, $C_c$ and $C_d$. For other embodiments of the present invention, the Muller C-element may not be suitable. With this substitution, in the present embodiment, the pipeline will function properly but will operate slower than with the present, reduced-state control element. This may be demonstrated by replacing the control element of the present invention with a Muller-C element and comparing the timing of certain steps in the pipeline operation. The timing diagram of FIG. 10 shows timing of pipeline transitions where the Muller C-element is used instead of the control element of the present invention in controllers $C_b$, $C_c$ and $C_d$ of FIG. 3. The timing diagram of FIG. 11 shows timing where the control element of the present invention is used in controllers $C_b$, $C_c$ and $C_d$.

Figure 12:
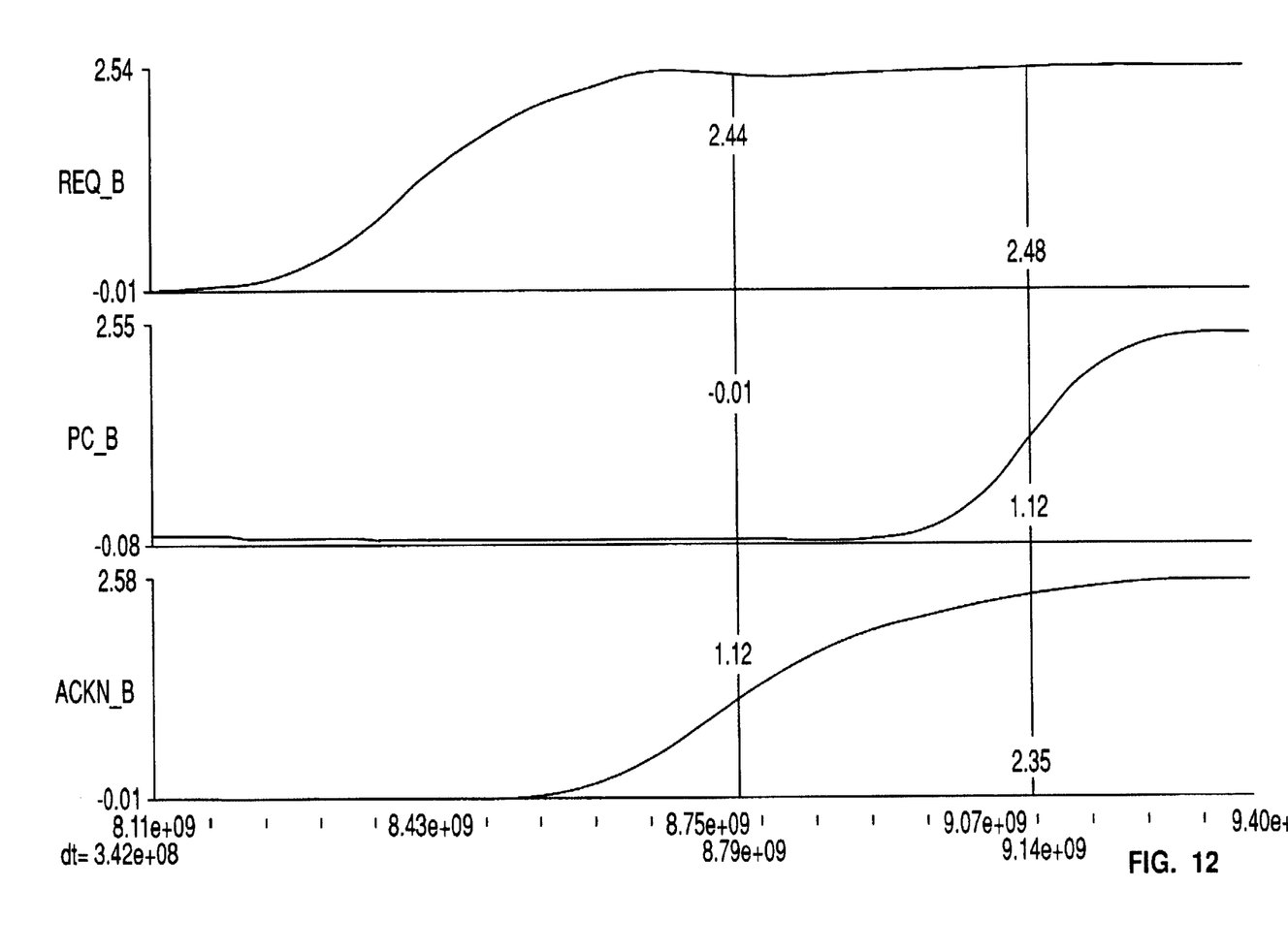
FIG. 12 provides an expanded portion of the timing diagram of FIG. 10, which focuses on the switching of the Muller C-element output triggered by the request input.
Figure 13:
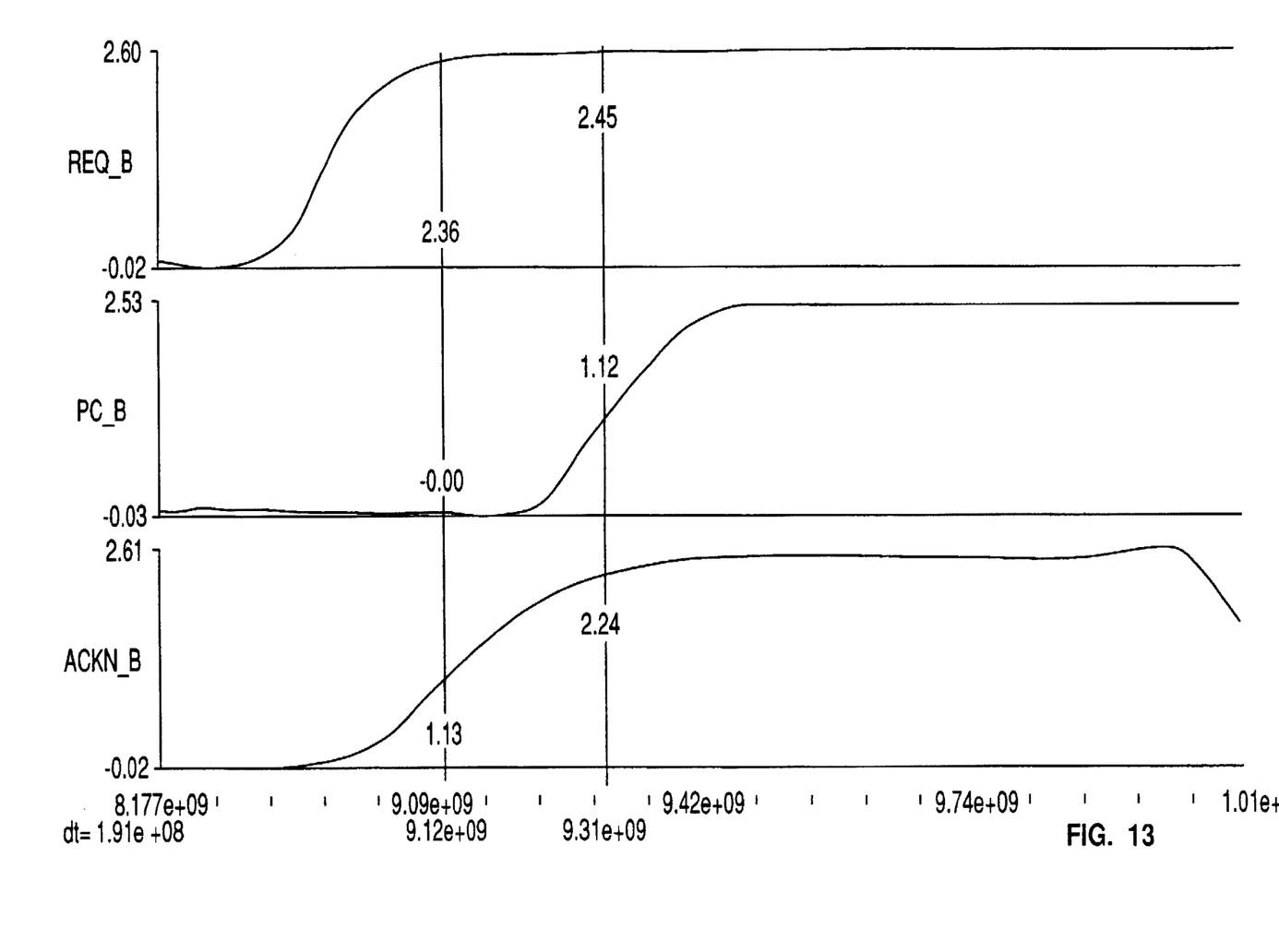
FIG. 13 provides an expanded portion of the timing diagram of FIG. 11 which focuses on the switching of the output of the present invention triggered by the request input.

These timing diagrams show that when a request signal req__b, req__c or req__d to a control element $CE_b$, $CE_c$ or CEd goes high, this more quickly causes the output pc__b, pc__c or pc__d to go high in the control element of the present invention than in the Muller C-element. FIGS. 12 and 13 provide an expanded portion of these timing diagrams which more clearly shows the increase in speed of the present invention. For a Muller C-element as shown in FIG. 12, it takes about 342 picoseconds for the output pc__b to rise to a level of 1.12 v after the request signal req__b does. For the control element of the present invention as shown in FIG. 13, it takes about 189 picoseconds for the same response. In this example, the control elements of the present invention reduce the time for data to process through the pipeline by 153 picoseconds for each of the four stages in the pipeline, or a total of 612 picoseconds.

The increase in speed is due to the smaller number of gates in the control element of the present invention, and due to the nature of the gates required. In general terms, there are fewer gates for the request signal to propagate through in order to switch the output of the control element in the present invention than in the Muller C-element. Also, for the circuit of the present invention, the request signal merely pulls down n-type FET, Q3, in order to initiate the switch of the output of the control element. In contrast, for the Muller C-element, the request signal switches both p-type FET, Q3, and n-type FET, Q2, on the front end, and p-type FET, Q6, and n-type FET, Q5, on the back end. Since an n-type FET inherently switches faster than a p-type FET having the same conductance, it is faster to switch the one n-type FET, Q3, in the present invention than to switch the two pairs of FET's Q2/Q3 and Q5/Q6, which include the p-type FET's, Q3 and Q6, in that of the traditional Muller C-element circuit. Also, in the Muller C-element circuit, the FET's Q2/Q3 and Q5/Q6 being switched by the request signal are located disadvantageously in the circuit, in that these FET's are stacked in series with a number of other FET's.

What is claimed is:

1. A data processing apparatus comprising:
    a plurality of data processor stages connected by data lines as a series of processor stages, one stage succeeding another stage in the series, wherein data signals are processed in a preceding stage and communicated to a succeeding stage in the series; and
    a plurality of control elements, a control element having first and second inputs receiving input signals from a first and second processor stage, and an output for sending a signal to enable processing in a third processor stage, the input signals and output having a first and second state, wherein, with the input signals and the output having assumed the first state, the output remains in the first state in response to solely a certain one of the input signals assuming the second state, but the output assumes the second state in response to solely the other one of the input signals assuming the second state.

2. The apparatus of claim 1, wherein the control element functions as a static element, and the apparatus further comprises:
    a number of input transistors connected to receive and reactive to the input signals, including solely a single transistor pair for receiving the first input signal; and
    a pair of output transistors connected to and being switched by the input transistors and providing the control element output; and
    wherein the control element output state may be changed by the first input signal switching solely the input single transistor pair, and by one of the transistors of the input single transistor pair switching solely the output transistor pair.

3. The apparatus of claim 1, the control element further comprising:
    a number of input transistors connected to receive and reactive to the input signals, including solely a single transistor for receiving the first input signal; and
    a pair of output transistors connected to and being switched by the input transistors and providing the control element output; and
    wherein the control element output state may be changed by the second input signal switching solely the single transistor, and the single transistor switching solely the output transistor pair.

4. The apparatus of claim 1, the data lines further comprising data input lines and data output lines for communicating input data signals and output data signals;

wherein such a processor stage has a precharge interval and an active interval, the active interval being when the data input signals are processed in the processor stage and communicated to a succeeding processor stage;

wherein signals on the data lines for the processor stage represent active data during a portion of the processor stage's active interval which is after completion of processing;

wherein such a control element first input provides an indication of whether the first processor stage data output lines have active data, and the control element second input provides an indication of whether the second processor stage data output lines have active data; and wherein the control element enables processing in the third processor stage when the first processor stage output data lines have active data, and the second processor stage output data lines do not have active data, and, once the control element has enabled the processing, the control element continues to enable the processing until the second processor stage output data lines have active data.

5. The apparatus of claim 4, wherein the processor active intervals are repeated and the active interval of one processor is asynchronous with the active interval of another processor.

6. The apparatus of claim 1, wherein the series of processors comprises:

a first group of three processors, a first processor being a first group initial processor, a second processor being a first group intermediate processor, and a third processor being a first group end processor, wherein data signals in a group are processed in and communicated from the initial processor to the intermediate processor, processed in and communicated from the intermediate processor to the end processor, and processed in and communicated from the end processor; and the control elements comprises:

a first intermediate control element in communication with the processors of the first group of three processors for enabling processing of the first group intermediate processor, and an end control element in communication with the last two processors and the first processor in the series for enabling processing of the last processor in the series.

7. A data processing apparatus comprising:

a plurality of data processor stages connected by data lines as a series of stages, the series having a first group of at least three stages, a first stage being a first group initial stage, a second stage being a first group intermediate stage, and a third stage being a first group end stage, wherein data signals in the first group are processed in and communicated from the initial stage to the intermediate stage, processed in and communicated from the intermediate stage to the end stage, and processed in and communicated from the end stage;

a plurality of control elements in communication with the stages of the first group for enabling processing after initialization of the apparatus, the control elements including:

an initial control element for enabling processing of the first stage in the series, at least a first intermediate control element for enabling processing of the first group intermediate stage, and an end control element for enabling processing of the last stage in the series;

wherein at least one of the control elements has first and second inputs for receiving such data signals and an output, the inputted data signals and the output having a first and second state; and wherein, with the inputted data signals and the output having assumed the first state, the output remains in the first state in response to solely a certain one of the inputted signals assuming the second state, but the output assumes the second state in response to solely the other one of the inputted signals assuming the second state.

8. The apparatus of claim 7, wherein the series of processors further comprise at least a second group of three processors, the second group overlapping the first group such that the initial processor in the second group is the intermediate processor in the first group, and the intermediate processor in the second group is the end processor in the first group; and wherein the plurality of control elements includes at least a second intermediate control element for enabling processing of the intermediate processor of the second group.

9. The apparatus of claim 8, wherein the control element functions as a static element, and further comprises:

a number of input transistors connected to receive and reactive to the input signals, including solely a single transistor pair for receiving the first input signal; and a pair of output transistors connected to and being switched by the input transistors and providing the control element output; and wherein the control element output state may be changed by the first input signal switching solely the input single transistor pair, and by one of the transistors of the input single transistor pair switching solely the output transistor pair.

10. A control element for controlling a data processing apparatus having a number of data processor stages, comprising:

first and second inputs receiving first and second input signals from a first and second processor stage; and an output sending a signal to enable processing in a third processor stage;

wherein the first and second input signals and the output have a first and second state;

wherein, with the input signals and the output having assumed the first state, the output remains in the first state in response to solely a certain one of the input signals assuming the second state, but the output assumes the second state in response to solely the other one of the input signals assuming the second state.

11. The control element of claim 10, wherein the control element functions as a static element, and further comprises:

a number of input transistors connected to receive and reactive to the input signals, including solely a single transistor pair for receiving the first input signal; and a pair of output transistors connected to and being switched by the input transistors and providing the control element output;

wherein the control element output state may be changed by the first input signal switching solely the input single transistor pair, and by one of the transistors of the input single transistor pair switching the output transistor pair.

12. The control element of claim 11 further comprising:
a number of input transistors connected to receive and reactive to the input signals, including solely a single transistor for receiving the first input signals; and
a pair of output transistors connected to and being switched by the input transistors and providing the control element output;
wherein the control element output state may be changed by the first input signal switching solely the single transistor, and the single transistor switching the output transistor pair.

13. A method for controlling a processor stage in a series of a plurality of processor stages, comprising the steps of:
connecting the plurality of stages by data lines as a series of stages, one stage succeeding another stage in the series, so that data signals are processed in a preceding stage and communicated to a succeeding stage in the series;
receiving input signals from a first and second stage on first and second binary state inputs of a control element having a binary state output;
sending the first binary state as an output signal from the control element to a third stage, thereby enabling processing in the third stage, only if both input signals assume the first binary state;
once the output has assumed the first state, continuing to send the first binary state as an output signal from the control element to the third stage, in response to solely a certain one of the input signals assuming the second state, but sending the second state as an output signal in response to solely the other one of the input signals assuming the second state.

14. The method of claim 13, wherein the control element functions as a static element, the method further comprising the step of:
changing the control element output to the first binary state by the first input signal switching solely a single transistor pair of the control element, the transistor pair being connected to receive and react to the input signal, and by one of the transistors of the input single transistor pair switching solely an output transistor pair of the control element.

15. The method of claim 13, further comprising the step of:
changing the control element output to the first binary state by the first input signal switching solely a single transistor of the control element, the transistor being connected to receive and react to the input signal, and by the single transistor switching solely an output transistor pair of the control element.

* * * * *